United States Patent
Gortsas

(10) Patent No.: US 10,442,382 B2
(45) Date of Patent: Oct. 15, 2019

(54) METHOD AND CONTROL UNIT FOR CONTROLLING AT LEAST ONE ASSISTANCE FUNCTION IN THE EVENT OF A ROLLOVER OF A VEHICLE, AND ASSISTANCE SYSTEM

(71) Applicant: Robert Bosch GmbH, Stuttgart (DE)

(72) Inventor: Nikolaos Gortsas, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 15/890,889

(22) Filed: Feb. 7, 2018

(65) Prior Publication Data

US 2018/0244230 A1   Aug. 30, 2018

(30) Foreign Application Priority Data

Feb. 24, 2017   (DE) .................. 10 2017 202 998

(51) Int. Cl.
| | |
|---|---|
| *B60R 21/0132* | (2006.01) |
| *B60W 30/04* | (2006.01) |
| *B60W 40/112* | (2012.01) |
| *B60W 40/107* | (2012.01) |
| *B60R 21/00* | (2006.01) |
| *B60W 50/00* | (2006.01) |

(52) U.S. Cl.
CPC ......... *B60R 21/0132* (2013.01); *B60W 30/04* (2013.01); *B60W 40/107* (2013.01); *B60W 40/112* (2013.01); *B60R 2021/0018* (2013.01); *B60R 2021/0027* (2013.01); *B60R 2021/01325* (2013.01); *B60W 2050/0049* (2013.01); *B60W 2050/0088* (2013.01); *B60W 2550/40* (2013.01); *B60W 2750/40* (2013.01)

(58) Field of Classification Search
CPC ....... B60R 21/0132; B60R 2021/0027; B60W 30/04; B60W 40/112; B60W 40/107; B60W 2750/40; B60W 2050/0088; B60W 2050/0049; B60W 2550/40
USPC .......................................................... 701/45
See application file for complete search history.

(56) References Cited

U.S. PATENT DOCUMENTS

| | | | |
|---|---|---|---|
| 2004/0176897 A1* | 9/2004 | Williams | ............ B60R 21/0132 701/70 |
| 2005/0080544 A1* | 4/2005 | Suzuki | ............... B60R 21/0132 701/70 |
| 2006/0074530 A1* | 4/2006 | Meyers | ................ B60G 17/016 701/1 |
| 2006/0261937 A1* | 11/2006 | Lu | .......................... B60T 8/172 340/446 |

(Continued)

*Primary Examiner* — Marthe Y Marc-Coleman
(74) *Attorney, Agent, or Firm* — Norton Rose Fulbright US LLP; Gerard Messina

(57) ABSTRACT

A method for controlling at least one assistance function in the event of a rollover of a vehicle. The vehicle includes at least one acceleration sensor with zero point feedback. The method includes reading in a sensor signal and ascertain or reading a feedback signal. The sensor signal represents acceleration values detected by the at least one acceleration sensor. The feedback signal represents control values for the zero point feedback of the at least one acceleration sensor. The method also includes determining an occurrence of a rollover as a function of a result of comparisons. Furthermore, the method includes providing a rollover signal for output to the at least one assistance function. The rollover signal represents a recognized rollover of the vehicle.

9 Claims, 5 Drawing Sheets

(56) References Cited

U.S. PATENT DOCUMENTS

2008/0243335 A1* 10/2008 Rao .................. B60C 23/0408
701/38

* cited by examiner

METHOD AND CONTROL UNIT FOR CONTROLLING AT LEAST ONE ASSISTANCE FUNCTION IN THE EVENT OF A ROLLOVER OF A VEHICLE, AND ASSISTANCE SYSTEM

CROSS REFERENCE

The present application claims the benefit under 35 U.S.C. § 119 of German Patent Application No. DE 102017202998.6 filed on Feb. 24, 2017, which is expressly incorporated herein by reference in its entirety.

BACKGROUND INFORMATION

The present invention is directed to a device and a method for controlling at least on assistance function. Moreover, the present invention relates to a computer program.

A rollover of a vehicle may be detected, and an emergency call may then be automatically transmitted. Such a rollover may take place in one of several different ways, for example.

SUMMARY

Against this background, with the approach presented here a method, a control unit that uses this method, and a corresponding computer program are provided. Advantageous refinements and improvements of the device are described herein.

According to specific embodiments, in particular a reliable and precise emergency call activation may be implemented during slow vehicle rollovers, despite sensor offset compensation or zero point feedback of an acceleration sensor. This is based, for example, on the observation that when a useful signal of an acceleration sensor is small, even though a large roll angle of a vehicle has been statically achieved, an offset control may have reached a high value that may be responsible for the useful signal being small despite a large roll angle, for example relative to a transverse axis and a vertical axis of the vehicle, i.e., in the Y direction and the Z direction. When a small roll angle is statically achieved, an offset control may, for example, then also assume only a small value due to the fact that a distance from the zero position or from the zero point may be correspondingly small. The offset control may be ended as soon as the zero position is reached.

According to specific embodiments, it is advantageously possible in particular to reliably and correctly recognize a slow rollover using acceleration sensors, for example in the vertical direction and alternatively also in the lateral direction, or with respect to a vertical axis and alternatively also a transverse axis of the vehicle, even with a slow zero point feedback of the sensors. Large roll angles of the vehicle may thus be reliably differentiated from small roll angles, despite offset control or zero point feedback of acceleration sensors. Unnecessary false-positive interventions by assistance functions may thus be avoided.

An example method for controlling at least one assistance function in the event of a rollover of a vehicle is provided, the vehicle including at least one acceleration sensor with zero point feedback, and the method including at least the following steps:

reading in a sensor signal and a feedback signal, or reading in the sensor signal and ascertaining the feedback signal using the sensor signal, the sensor signal representing acceleration values detected by the at least one acceleration sensor, and the feedback signal representing control values for zero point feedback of the at least one acceleration sensor;

carrying out a first comparison of the sensor signal to a first threshold value and to a second threshold value, and carrying out a second comparison of the feedback signal to a third threshold value; the first threshold value and the second threshold value representing acceleration values, the first threshold value being associated with a static tilt angle of the vehicle and representing a higher acceleration value than the second threshold value, and the third threshold value representing a control value that is associated with a difference between the first threshold value and the second threshold value;

determining an occurrence of a rollover as a function of a result of the first comparison and of a result of the second comparison; and providing a rollover signal for output to the at least one assistance function when the occurrence of a rollover has been determined in step of determining 230.

The example method may be implemented, for example, in software or hardware, or in a mixed form composed of software and hardware, for example in a control unit. A rollover of a vehicle may be understood to mean a rotational movement of the vehicle about its longitudinal axis or transverse axis, and additionally or alternatively, a position of the vehicle that results from same. An acceleration sensor may include at least one sensitive axis. When a zero point feedback is carried out, a useful signal of the at least one acceleration sensor may be corrected by at least one control value. The feedback signal may represent cumulative control values. The step of reading in, the step of carrying out, and additionally or alternatively the step of determining may be carried out continuously. The control value associated with a difference between the first threshold value and the second threshold value may represent cumulative control values of the feedback signal. The control value may correspond to the difference between the first threshold value and the second threshold value. The rollover signal may advantageously represent a recognized rollover of the vehicle. The feedback signal may advantageously be either read in, for example if it is already present, or ascertained using the sensor signal.

According to one specific embodiment, the occurrence of a rollover may be determined in the step of determining when the sensor signal exceeds the first threshold value for a predefined time period. An exceedance of a threshold value may represent reaching and surpassing the threshold value. Such a specific embodiment offers the advantage that the at least one assistance function may be quickly activated during a rapid movement of the vehicle beyond the static tilt angle, and thus during a quick rollover.

The occurrence of a rollover may also be determined in the step of determining when the sensor signal falls below the first threshold value and exceeds the second threshold value, and the feedback signal exceeds the third threshold value. Such a specific embodiment offers the advantage that rollovers may be reliably differentiated from non-rollover events, and false-positive activations of assistance functions may thus be at least reduced or prevented. Slow rollovers may thus also be reliably recognized.

The occurrence of a rollover may be determined in the step of determining when the exceedance of the second threshold value by the sensor signal and the exceedance of the third threshold value by the feedback signal take place within a predefined time interval. Such a specific embodiment offers the advantage that a temporal relationship between acceleration values and control values may be ensured, and a false-positive triggering of an assistance function may thus be reliably avoided.

In particular, in the step of reading in, a sensor signal may be read in that represents acceleration values, detected by the at least one acceleration sensor, concerning a vertical axis, a transverse axis, and additionally or alternatively a longitudinal axis, of the vehicle. Such a specific embodiment offers the advantage that acceleration values concerning only one axis, for example, may also be sufficient to draw reliable and correct conclusions regarding the actual occurrence of a rollover.

In addition, the rollover signal may be provided for output to an emergency call function in the step of providing. The rollover signal may be suitable for effectuating a transmission of an emergency call during use by the emergency call function. Such a specific embodiment offers the advantage that assistance measures may be requested in a timely manner, also in the event of a rollover when vehicle occupants may possibly be unconscious.

The approach presented here also provides a control unit that is designed for carrying out, controlling, or implementing the steps of one variant of a method presented here in appropriate devices. The object underlying the present invention may also be quickly and efficiently achieved by this embodiment variant of the present invention in the form of a control unit.

For this purpose, the control unit may include at least one processing unit for processing signals or data, at least one memory unit for storing signals or data, at least one interface to a sensor or an actuator for reading in sensor signals from the sensor or for outputting control signals to the actuator, and/or at least one communication interface for reading in or outputting data that are embedded in a communication protocol. The processing unit may be, for example, a signal processor, a microcontroller, or the like, and the memory unit may be a flash memory, an EEPROM, or a magnetic memory unit. The communication interface may be designed for reading in or outputting data wirelessly and/or in a line-bound manner; a communication interface which may read in or output the line-bound data may read in these data electrically or optically, for example, from an appropriate data transmission line, or output same to an appropriate data transmission line.

In the present context, a control unit may be understood to mean an electrical device which processes sensor signals and outputs control and/or data signals as a function thereof. The control unit may include an interface which may have a hardware and/or software design. In a hardware design, the interfaces may be part of a so-called system ASIC, for example, which contains various functions of the control unit. However, it is also possible for the interfaces to be dedicated, integrated circuits, or to be at least partially made up of discrete components. In a software design, the interfaces may be software modules which are present on a microcontroller, for example, in addition to other software modules.

In one advantageous embodiment, the control unit carries out a control of at least one assistance function of a vehicle. For this purpose, the control unit may access, for example, sensor signals such as acceleration signals and rotation rate signals, and may access feedback signals of the sensor system. The control unit is designed for providing a rollover signal, using the sensor signals and the feedback signals, when a rollover has been determined. The control of the at least one assistance function may represent an activation of an emergency call.

Also advantageous is a computer program product or a computer program including program code which may be stored on a machine-readable medium or memory medium such as a semiconductor memory, a hard disk, or an optical memory, and used for carrying out, implementing, and/or controlling the steps of the method according to one of the specific embodiments described above, in particular when the program product or program is executed on a computer or a device.

An example assistance system for a vehicle is also provided, the assistance system including at least the following features:
one specific embodiment of the control unit described above; and
the at least one acceleration sensor with zero point feedback, the at least one acceleration sensor and the control unit being connectable or connected to one another with signal transmission capability.

One specific embodiment of the above-described control unit may thus advantageously be used or employed in the assistance system in order to control at least one assistance function of the vehicle.

Exemplary embodiments of the approach presented here are illustrated in the figures and explained in greater detail below.

DETAILED DESCRIPTION OF EXAMPLE EMBODIMENTS

Figure 1:
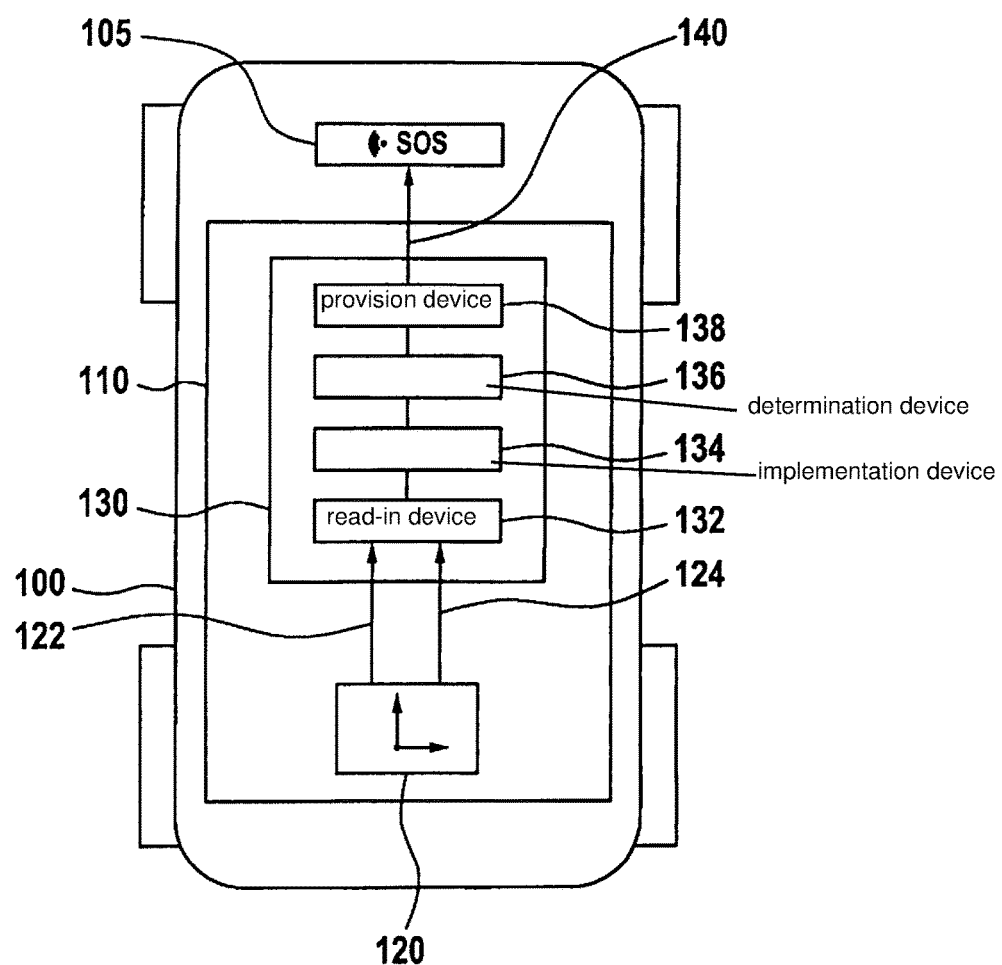
FIG. 1 shows a schematic illustration of an assistance system according to one exemplary embodiment in a vehicle.

In the description below of advantageous exemplary embodiments of the present invention, identical or similar reference numerals are used for the elements having a similar action which are illustrated in the various figures, and a repeated description of these elements is dispensed with.

FIG. 1 shows a schematic illustration of an assistance system 110 according to one exemplary embodiment in a vehicle 100. Vehicle 100 is, for example, a motor vehicle, in particular a passenger vehicle, a truck, or some other commercial vehicle. Of vehicle 100, an assistance function 105 and assistance system 110 are shown according to the exemplary embodiment illustrated in FIG. 1. Assistance function 105 and assistance system 110 are connected to one another with signal transmission capability. Assistance function 105 is an emergency call function, for example.

According to the exemplary embodiment shown in FIG. 1, assistance system 110 includes an acceleration sensor 120 with zero point feedback, and a control unit 130. Control unit 130 and acceleration sensor 120 are connected to one another with signal transmission capability.

Acceleration sensor 120 is situated in vehicle 100. Acceleration sensor 120 is designed for detecting an acceleration, i.e., an acceleration of vehicle 100 relative to at least one axis. In addition, acceleration sensor 120 is designed for providing or outputting a sensor signal 122. Sensor signal 122 represents values of the acceleration detected by acceleration sensor 120. Acceleration sensor 120 is also designed, for example, for providing a feedback signal 124. Feedback signal 124 represents control values for the zero point feedback of acceleration sensor 120. Alternatively, feedback signal 124 may also be provided by a control device for controlling acceleration sensor 120.

Control unit 130 is designed for controlling assistance function 105 in the event of a rollover of vehicle 100. For this purpose, control unit 130 is designed for generating a rollover signal 140, using sensor signal 122 and feedback signal 124. Control unit 130 includes a read-in device 132, an implementation device 134, a determination device 136, and a provision device 138. Read-in device 132 is designed for reading in sensor signal 122 and feedback signal 124 from acceleration sensor 120, or reading in sensor signal 122 from acceleration sensor 120 and ascertaining feedback signal 124 in the control unit based on acceleration signal 122.

Implementation device 134 is designed for carrying out a first comparison and a second comparison. Sensor signal 122 is compared to a first threshold value and to a second threshold value in the first comparison. The feedback signal is compared to a third threshold value in the second comparison. The first threshold value and the second threshold value represent acceleration values. The first threshold value represents an acceleration value that is higher than the second threshold value. In addition, the first threshold value is associated with a static tilt angle of vehicle 100 with regard to a rollover. The third threshold value represents a control value of the zero point feedback that is associated with or corresponds to a difference between the first threshold value and the second threshold value.

Determination device 136 is designed for determining an occurrence of a rollover of vehicle 100 as a function of a result of the first comparison and of a result of the second comparison. Provision device 138 is designed for providing rollover signal 140 for output to assistance function 105. Rollover signal 140 represents a recognized or determined rollover of vehicle 100. In other words, provision device 138 is designed for providing rollover signal 140 when an occurrence of a rollover has been determined with the aid of determination device 136. According to the exemplary embodiment illustrated in FIG. 1, rollover signal 140 is suitable for effectuating a transmission of an emergency call when the rollover signal is used by assistance function 105 or emergency call function 105.

Figure 2:
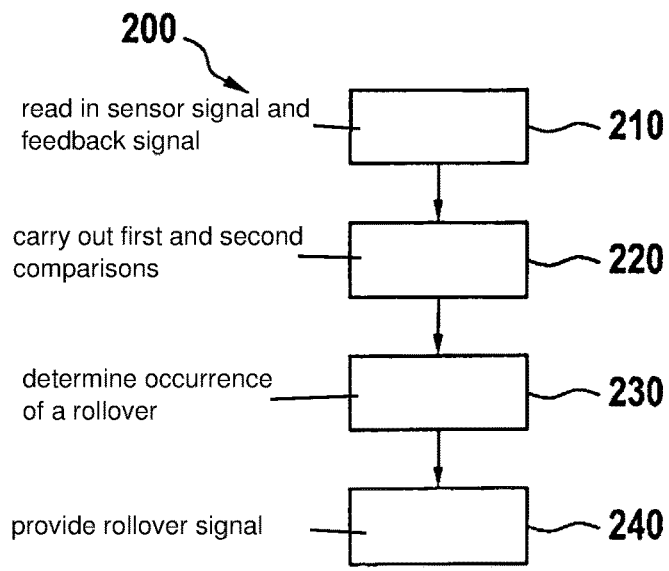
FIG. 2 shows a flow chart of a method for controlling according to one exemplary embodiment.

FIG. 2 shows a flow chart of a method 200 for control according to one exemplary embodiment. Method 200 may be carried out for controlling at least one assistance function in the event of a rollover of the vehicle. Method 200 may be carried out for control with the aid of or using the control unit from FIG. 1 or a similar control unit. In addition, method 200 may be carried out for control in conjunction with an assistance system such as the assistance system from FIG. 1. Method 200 may thus be carried out for control in conjunction with a vehicle that includes at least one acceleration sensor with a zero point feedback, such as the vehicle from FIG. 1.

In method 200 for control, a sensor signal and a feedback signal are read in in a step 210 of reading in. Alternatively, in step 210 the sensor signal is read in and the feedback signal is ascertained using the sensor signal. The sensor signal represents acceleration values detected by the at least one acceleration sensor, and the feedback signal represents control values for the zero point feedback of the at least one acceleration sensor. According to one exemplary embodiment, a sensor signal is read in in step 210 of reading in, which represents acceleration values concerning a vertical axis, a transverse axis, and/or a longitudinal axis of the vehicle detected by the at least one acceleration sensor.

A first comparison of the sensor signal to a first threshold value and to a second threshold value, and a second comparison of the feedback signal to a third threshold value are subsequently carried out in a step 220 of carrying out. The first threshold value and the second threshold value represent acceleration values. The first threshold value is associated with a static tilt angle of the vehicle, and represents an acceleration value that is higher than the second threshold value. The third threshold value represents a control value that is associated with a difference between the first threshold value and the second threshold value.

An occurrence of a rollover is subsequently determined in a step 230 of determining, as a function of a result of the first comparison and of a result of the second comparison. According to one exemplary embodiment, the occurrence of a rollover is determined in step 230 of determining when the sensor signal exceeds the first threshold value, in particular for a predefined time period. Additionally or alternatively, the occurrence of a rollover is determined in step 230 of determining when the sensor signal falls below the first threshold value and exceeds the second threshold value, and the feedback signal exceeds the third threshold value. According to another exemplary embodiment, the occurrence of a rollover is determined in step 230 of determining when the exceedance of the second threshold value by the sensor signal and the exceedance of the third threshold value by the feedback signal take place within a predefined time interval.

A rollover signal for output to the at least one assistance function is subsequently provided in a step 240 of providing. The rollover signal here represents a recognized rollover of the vehicle.

Figure 3:
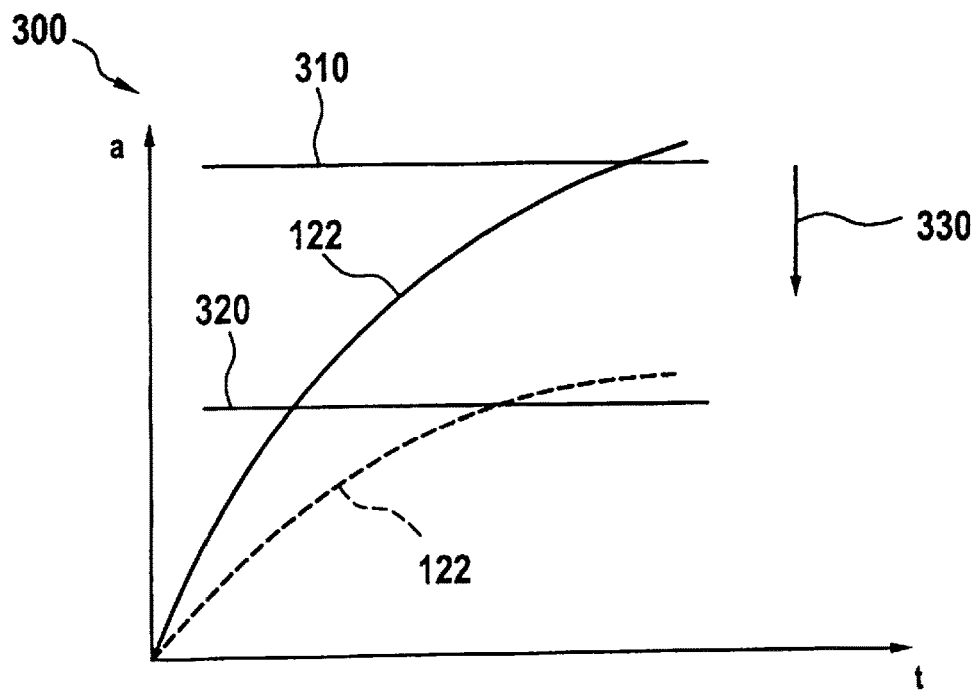
FIG. 3 shows a schematic acceleration value-time diagram according to one exemplary embodiment.

FIG. 3 shows a schematic acceleration value-time diagram 300 according to one exemplary embodiment. A time t is plotted on the abscissa axis, and an acceleration a or acceleration value a is plotted on the ordinate axis in diagram 300. Diagram 300 is to be considered in conjunction with the assistance system from FIG. 1 or a similar assistance system. Two possible sensor signals 122 of the acceleration sensor from FIG. 1 or a similar acceleration sensor are also depicted in the form of two graphs in diagram 300. In addition, a first threshold value 310 and a second threshold value 320, and symbolically, a loss 330 due to zero point feedback, are illustrated in diagram 300. Second threshold value 320 is situated between first threshold value 310 and the abscissa axis. A first version of sensor signal 122 exceeds second threshold value 320 and also first threshold value 310. A second version of sensor signal 122 exceeds only second threshold value 320. Loss 330 represents a signal loss between the versions of sensor signal 122.

In other words, FIG. 3 depicts an effect of the zero point feedback or offset control. As illustrated in FIG. 3, the offset control results in sensor signal 122 approaching zero as a function of time. A counter is typically implemented which counts how long sensor signal 122 is positive or negative. The counter is incremented when sensor signal 122 is positive, and the counter is decremented when sensor signal 122 is negative. When the counter has surpassed a threshold, a predefined constant acceleration value or control value is subtracted from sensor signal 120 or added to sensor signal 120, depending on the algebraic sign, so that the resulting signal converges toward zero. Before sensor signal 122 is used in a control unit and/or algorithm, the following computation, for example, takes place in the acceleration sensor itself:

$$a\_OC{>}{=}0{:}a\_OC{=}a\_Int{-}a\_Offset;$$

$$a\_OC{<}0{:}a\_OC{=}a\_Int{+}a\_Offset;$$

a_Int: sensor-internal signal prior to the offset control
a_Offset: offset control ascertained in the sensor
a_OC: offset control test signal at the sensor output
a_Int represents sensor signal 122, and aOffset represents feedback signal 124.

However, the offset-controlled signal or the second version of sensor signal 122 in FIG. 3 no longer corresponds to a large roll angle, but instead physically corresponds to a smaller angle, for example 20 degrees instead of the original 40 degrees.

The above computation in the control unit, which receives sensor signal 122, is inverted for ascertaining the control values of zero point feedback 124.

$$a\_OC{>}{=}0{:}a\_iOC{=}a\_OC{+}a\_SGOffset;$$

$$a\_OC{<}0{:}a\_iOC{=}a\_OC{-}a\_SGOffset;$$

a_iOC: sensor signal after inverting the offset control in the control unit
a_SGOffset: offset control ascertained in the control unit
a_OC: offset-controlled signal at the sensor output When the vehicle is slowly rotated as in FIG. 1 and has reached a large roll angle, for example 40 degrees, the first version of sensor signal 122 is above first threshold value 310 or a first qualification threshold, and thus has a high robustness against load situations. However, the offset-controlled signal or the second version of sensor signal 122 is below first threshold value 310. Therefore, second threshold value 320 or a sensitive threshold is to be used. For a rapid rotation of the vehicle, this may correspond to a roll angle of 20 degrees, for example. A false-positive activation of an emergency call, in this case at a roll angle of 20 degrees instead of 40 degrees, may be prevented with the aid of the control unit from FIG. 1.

Figure 4:
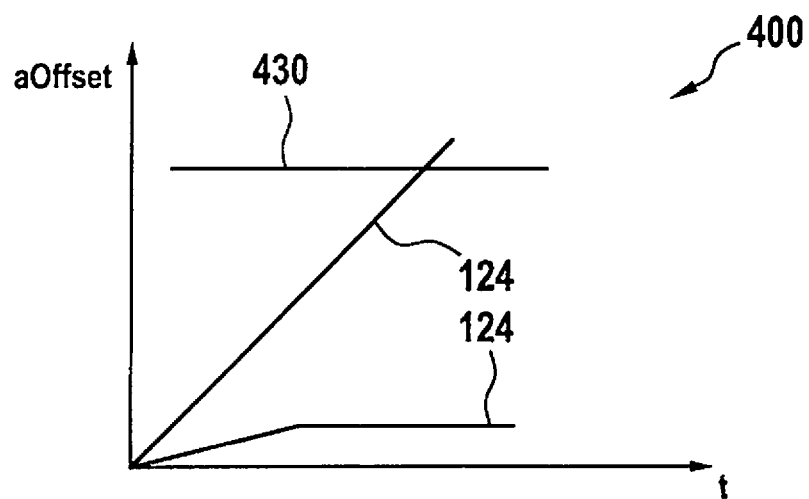
FIG. 4 shows a schematic control value-time diagram according to one exemplary embodiment.

FIG. 4 shows a schematic control value-time diagram 400 according to one exemplary embodiment. A time t is plotted on the abscissa axis, and a control value aSGOffset is plotted on the ordinate axis in diagram 400. Diagram 400 is to be considered in conjunction with the assistance system from FIG. 1 or a similar assistance system. Two versions of a feedback signal 124 are depicted in the form of two graphs in diagram 400. In addition, third threshold value 430 is depicted in diagram 400. A first version of feedback signal 124 exceeds third threshold value 430, and represents control values for a zero point feedback during a slow rotation of a vehicle and a large roll angle, for example 40 degrees. A second version of feedback signal 124 remains below third threshold value 430, and represents control values for a zero point feedback during a slow rotation of a vehicle and a small roll angle, for example 20 degrees.

In other words, FIG. 4 shows control values of the zero point feedback or a value of the offset control. During the slow rotation up to 40 degrees, a deterministically operating zero point feedback will reach a high value or high cumulative control values or a high feedback signal 124 or the first version of feedback signal 124, as illustrated in FIG. 4. The first version of the sensor signal from FIG. 3 is thus mapped onto the second version of the sensor signal with offset control. By use of third threshold value 430, it is possible for the sensitive threshold or the second threshold value from FIG. 3 to be active only when third threshold value 430 or the robust threshold from FIG. 4 has been exceeded or surpassed by the cumulative offset control or a feedback signal 124.

Figure 5:
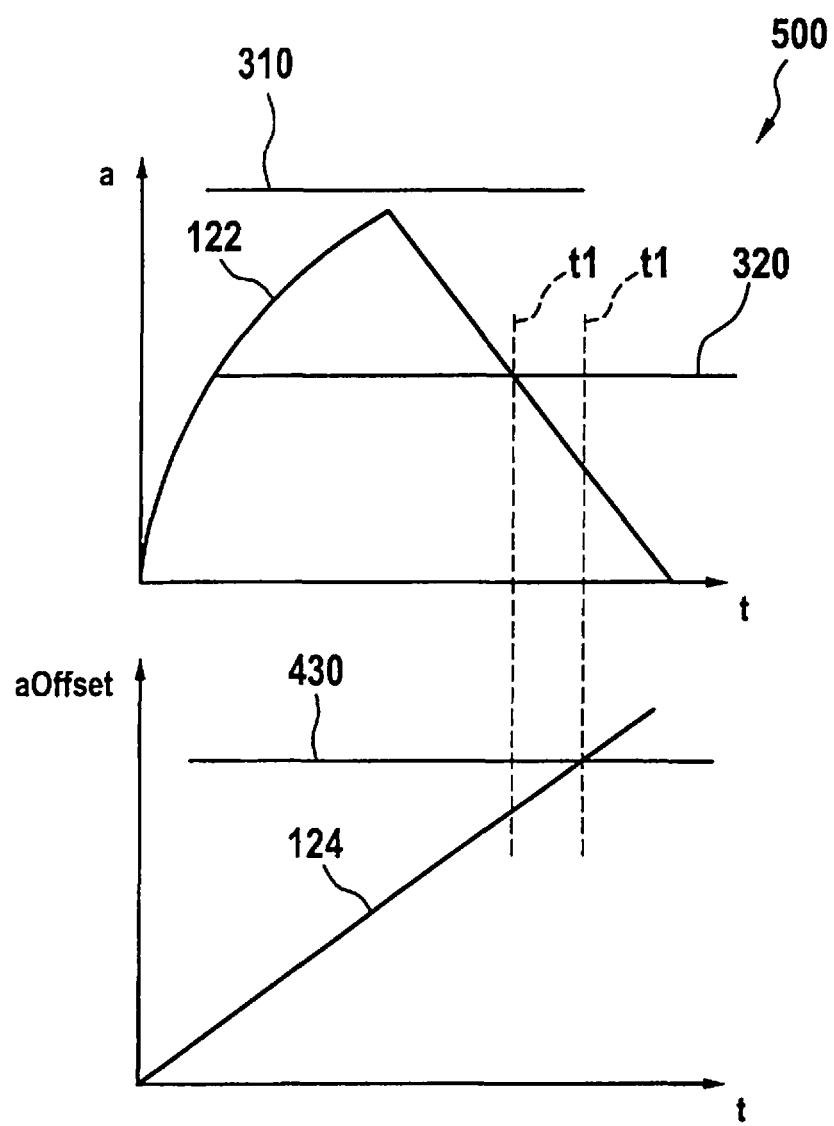
FIG. 5 shows a schematic diagram according to one exemplary embodiment.

FIG. 5 shows a schematic diagram 500 according to one exemplary embodiment. Diagram 500 is to be considered in conjunction with the assistance system from FIG. 1 or a similar assistance system. In addition, diagram 500 is to be considered in conjunction with the diagram from FIG. 3 and the diagram from FIG. 4. Diagram 500 includes a first subdiagram and a second subdiagram.

A time t is plotted on the abscissa axis, and an acceleration value is plotted on the ordinate axis, in the first subdiagram. The first subdiagram is similar to the diagram from FIG. 3. First threshold value 310 and second threshold value 320 as well as one possible sensor signal 122 are depicted in the first subdiagram. Sensor signal 122 in FIG. 5 initially rises from the abscissa axis to above second threshold value 320, and reaches the proximity of first threshold value 310, and then drops back below the second threshold value until reaching the abscissa axis.

A time t is plotted on the abscissa axis, and a control value aSGOffset is plotted on the ordinate axis, in the second subdiagram. The second subdiagram is similar to the diagram from FIG. 4. Third threshold value 430 and one possible feedback signal 124 are depicted in the second subdiagram. Feedback signal 124 in FIG. 5 rises from the abscissa axis to above third threshold value 430.

In addition, in the two subdiagrams a first point in time t1 and a second point in time t2 are depicted by lines in parallel to the ordinate axes. Sensor signal 122 falls below second threshold value 320 at first point in time t1. Also, third threshold value 430 has not been reached at first point in time t1. Feedback signal 124 exceeds third threshold value 430 at second point in time t2. In addition, feedback signal 124 falls below second threshold value 320 at second point in time t2. Second point in time t2 is chronologically after first point in time t1.

In other words, during a rapid rotation of a vehicle, for example to below first threshold value 310, for example at 40 degrees, with a subsequent standstill, sensor signal 122 will exceed the sensitive threshold or second threshold value 320, as illustrated in FIG. 5. Cumulative offset control aSGOffset or feedback signal 124 will reach third threshold value 430. However, since sensor signal 122 approaches zero due to the zero point feedback, the condition of second threshold value 320 being exceeded is no longer met at second point in time t2, when the condition of third threshold value 430 being exceeded is met. A distance between first threshold value 310 and second threshold value 320 corresponds, for example, to third threshold value 430. The above-mentioned conditions are met simultaneously or within a time interval defined as permissible only when sensor signal 122 has also exceeded first threshold value 310. In particular, a false-positive emergency call activation may be prevented in this way.

Figure 6:
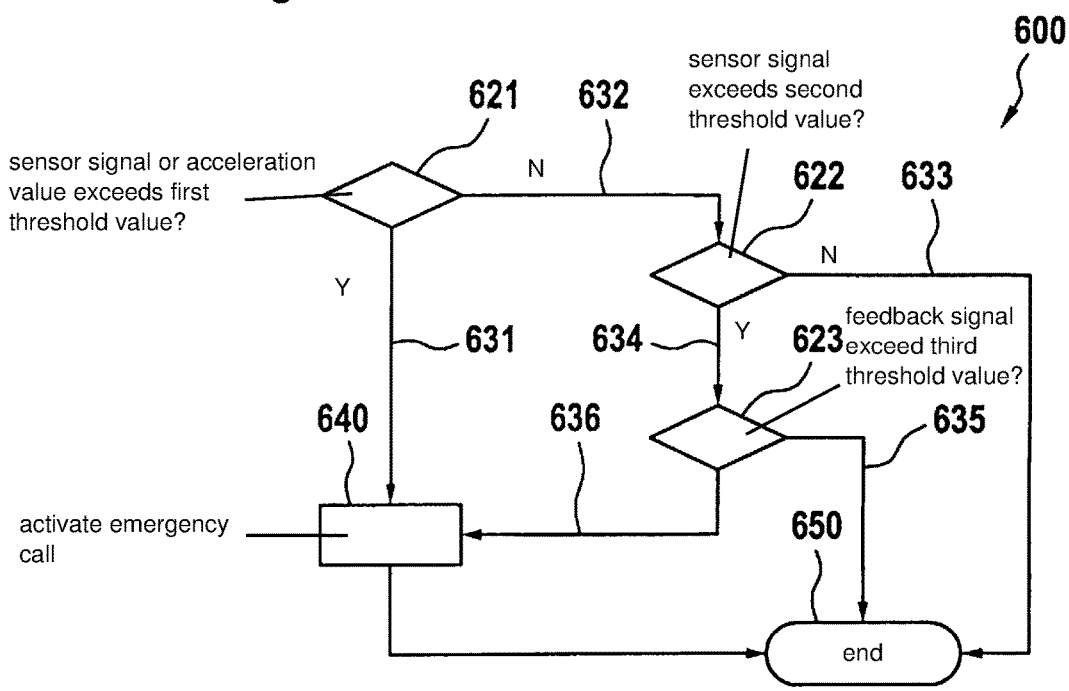
FIG. 6 shows a flow chart of a process for controlling according to one exemplary embodiment.

FIG. 6 shows a flow chart of a process 600 for control according to one exemplary embodiment. Process 600 is associated with the method for control shown in FIG. 2, or a similar method.

A check is made in a block 621 as to whether the sensor signal or the acceleration value exceeds the first threshold value. If the sensor signal exceeds the first threshold value, process 600 follows a path 631 to an activation of an emergency call in a block 640, whereupon process 600 terminates at a block 650. If the sensor signal does not exceed the first threshold value, process 600 follows a path 632 to a block 622.

A check is made in block 622 as to whether the sensor signal exceeds the second threshold value. If the sensor signal does not exceed the second threshold value, process 600 follows a path 633 and terminates at block 650. If the sensor signal exceeds the second threshold value, process 600 follows a path 634 to a block 623.

It is determined in block 623 whether the feedback signal exceeds the third threshold value. If the feedback signal does not exceed the third threshold value, process 600 follows a path 635 and terminates at block 650. If the feedback signal exceeds the third threshold value, process 600 follows a path 636 to block 640 and then to block 650.

In other words, process 600 may be divided into two main paths. A robust path may activate the emergency call directly after first block 621, while a sensitive path results in emergency call activation only when in addition, the third threshold value is exceeded by the feedback signal or cumulative offset control aSGOffset.

Exemplary embodiments as well as fundamentals and application options are explained once more in summary and/or briefly presented, with reference to the figures described above.

Application options result, for example, with regard to a static rollover/pitchover recognition or recognition of a rollover of a vehicle 100. Provided exemplary embodiments may be used to recognize a slow rotation, using at least one acceleration sensor 120 that is offset-controlled or that has a zero point feedback. In particular, this also functions for rotations about a transverse axis of vehicle 100 on an appropriate test stand for a so-called pitchover recognition. Possible sensor combinations may have, for example, aZ alone for a rotation about a longitudinal axis or transverse axis of vehicle 100, aY/aZ combined for a rotation about the longitudinal axis, or aX/aZ combined for a rotation about the transverse axis.

For a rapid rotation to below the static tilt angle of vehicle 100, according to exemplary embodiments a false-positive emergency call activation may be prevented. According to exemplary embodiments, a slow rotation to above the static tilt angle of vehicle 100 may be reliably recognized as a rollover.

In conjunction with regulations concerning automatic emergency call activation after a vehicle rollover, a certification test may be carried out which provides a slow vehicle rotation about the longitudinal axis of vehicle 100. The rotational speed may be low enough that the zero point feedback of standard acceleration sensors 120 may be made noticeable, for example in the aY and aZ directions, which may result in a loss of the useful signal. In addition, the rotational speed is so low that conventional rotation-based concepts for recognizing a rollover cannot be used. Such a slow rotation could be detected by recognizing a gravity vector in the aY and aZ directions. This would require so-called offset-stable acceleration sensors having a low offset over the lifetime and temperature range. However, acceleration sensors 120 with a slow zero point feedback or offset control are common and economical. Even without the real useful signal or sensor signal 122, according to exemplary embodiments it is possible to differentiate a slow rotation with a large roll angle from real rotations, which are able to achieve only a small roll angle. An accumulation of false-positive activations of emergency call function 105 may thus be prevented. A slow rollover may thus be detected with regard to possible regulations by use of a standard airbag sensor system without compromising the robustness. Reducing the likelihood of false-positive activations of emergency call function 105, and thus increasing the robustness of a rollover recognition, may be made possible according to exemplary embodiments.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for controlling at least one assistance function in the event of a rollover of a vehicle, the vehicle including at least one acceleration sensor with zero point feedback, the method comprising:
    one of: (i) reading in a sensor signal and a feedback signal, or (ii) reading in the sensor signal and ascertaining the feedback signal using the sensor signal, the sensor signal representing acceleration values detected by the at least one acceleration sensor, and the feedback signal representing control values for the zero point feedback of the at least one acceleration sensor;
    carrying out a first comparison of the sensor signal to a first threshold value and to a second threshold value, and carrying out a second comparison of the feedback signal to a third threshold value, the first threshold value and the second threshold value representing acceleration values, the first threshold value being associated with a static tilt angle of the vehicle and representing a higher acceleration value than the second threshold value, and the third threshold value representing a control value that is associated with a difference between the first threshold value and the second threshold value;
    determining an occurrence of a rollover as a function of a result of the first comparison and of a result of the second comparison; and
    providing a rollover signal for output to the at least one assistance function when the occurrence of a rollover has been determined in the determining step.

2. The method as recited in claim 1, wherein the occurrence of a rollover is determined in the determining step when the sensor signal exceeds the first threshold value.

3. The method as recited in claim 1, wherein the occurrence of a rollover is determined in the determining step when the sensor signal falls below the first threshold value and exceeds the second threshold value, and the feedback signal exceeds the third threshold value.

4. The method as recited in claim 3, wherein the occurrence of a rollover is determined in the determining step when the exceedance of the second threshold value by the sensor signal and the exceedance of the third threshold value by the feedback signal take place within a predefined time interval.

5. The method as recited in claim 1, wherein in the reading in step, a sensor signal is read in that represents acceleration values, detected by the at least one acceleration sensor, concerning at least one of a vertical axis, a transverse axis, and a longitudinal axis, of the vehicle.

6. The method as recited in claim 1, wherein the rollover signal is provided for output to an emergency call function in the providing step, the rollover signal for effectuating a transmission of an emergency call during use by the emergency call function.

7. A control unit configured for controlling at least one assistance function in the event of a rollover of a vehicle, the vehicle including at least one acceleration sensor with zero point feedback, the control unit configured to:
one of: (i) read in a sensor signal and a feedback signal, or (ii) read in the sensor signal and ascertaining the feedback signal using the sensor signal, the sensor signal representing acceleration values detected by the at least one acceleration sensor, and the feedback signal representing control values for the zero point feedback of the at least one acceleration sensor;
carry out a first comparison of the sensor signal to a first threshold value and to a second threshold value, and carry out a second comparison of the feedback signal to a third threshold value, the first threshold value and the second threshold value representing acceleration values, the first threshold value being associated with a static tilt angle of the vehicle and representing a higher acceleration value than the second threshold value, and the third threshold value representing a control value that is associated with a difference between the first threshold value and the second threshold value;
determine an occurrence of a rollover as a function of a result of the first comparison and of a result of the second comparison; and
provide a rollover signal for output to the at least one assistance function when the occurrence of a rollover has been determined.

8. An assistance system for a vehicle, the assistance system comprising:
a control unit configured for controlling at least one assistance function in the event of a rollover of the vehicle, the vehicle including at least one acceleration sensor with zero point feedback, the control unit configured to: one of: (i) read in a sensor signal and a feedback signal, or (ii) read in the sensor signal and ascertaining the feedback signal using the sensor signal, the sensor signal representing acceleration values detected by the at least one acceleration sensor, and the feedback signal representing control values for the zero point feedback of the at least one acceleration sensor; carry out a first comparison of the sensor signal to a first threshold value and to a second threshold value, and carry out a second comparison of the feedback signal to a third threshold value, the first threshold value and the second threshold value representing acceleration values, the first threshold value being associated with a static tilt angle of the vehicle and representing a higher acceleration value than the second threshold value, and the third threshold value representing a control value that is associated with a difference between the first threshold value and the second threshold value; determine an occurrence of a rollover as a function of a result of the first comparison and of a result of the second comparison; and provide a rollover signal for output to the at least one assistance function when the occurrence of a rollover has been determined; and
the at least one acceleration sensor with zero point feedback, the at least one acceleration sensor and the control unit being connectable or connected to one another with signal transmission capability.

9. A non-transitory machine-readable memory medium on which is stored a computer program for controlling at least one assistance function in the event of a rollover of a vehicle, the vehicle including at least one acceleration sensor with zero point feedback, the computer program, when executed by a processor, causing the processor to perform:
one of: (i) reading in a sensor signal and a feedback signal, or (ii) reading in the sensor signal and ascertaining the feedback signal using the sensor signal, the sensor signal representing acceleration values detected by the at least one acceleration sensor, and the feedback signal representing control values for the zero point feedback of the at least one acceleration sensor;
carrying out a first comparison of the sensor signal to a first threshold value and to a second threshold value, and carrying out a second comparison of the feedback signal to a third threshold value, the first threshold value and the second threshold value representing acceleration values, the first threshold value being associated with a static tilt angle of the vehicle and representing a higher acceleration value than the second threshold value, and the third threshold value representing a control value that is associated with a difference between the first threshold value and the second threshold value;
determining an occurrence of a rollover as a function of a result of the first comparison and of a result of the second comparison; and
providing a rollover signal for output to the at least one assistance function when the occurrence of a rollover has been determined in the determining step.

* * * * *